E. GOLDTHAIT.
Wheel-Plow.
No. 8,544.
Patented Nov. 25, 1851.
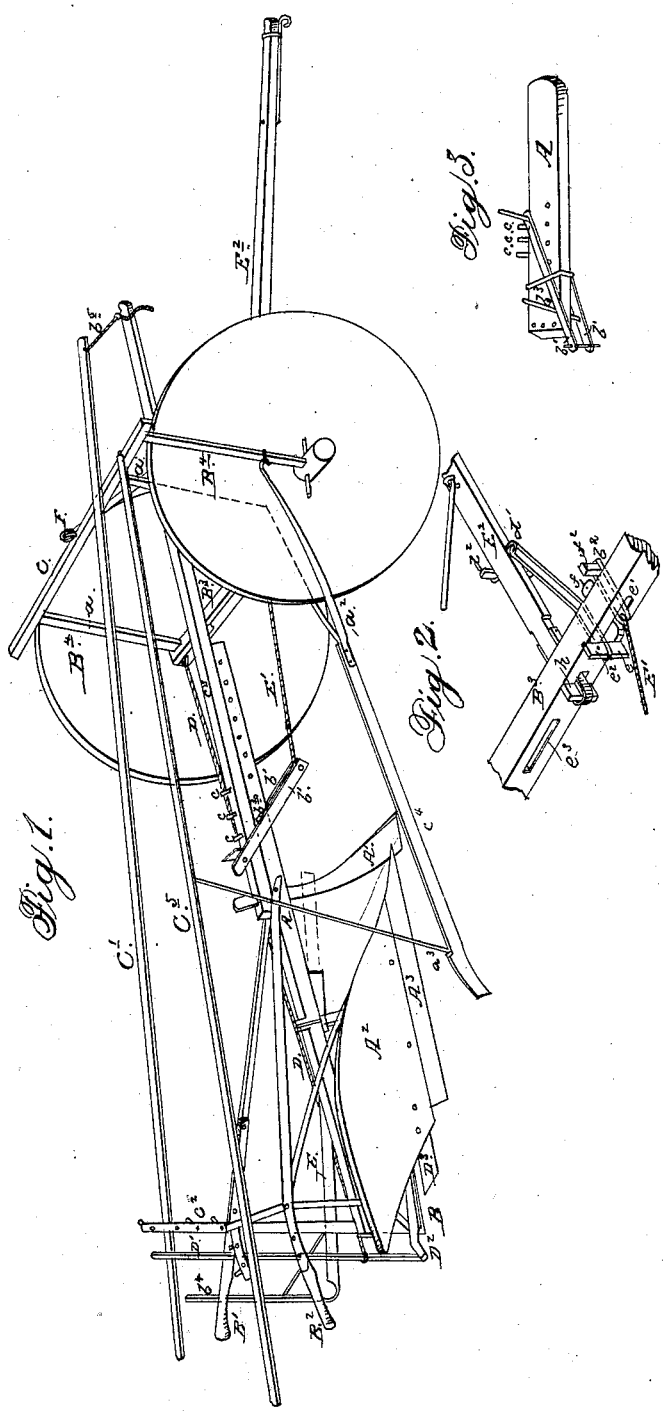

UNITED STATES PATENT OFFICE.

ELIJAH GOLDTHAIT, OF FORT WAYNE, INDIANA.

IMPROVEMENT IN PLOWS.

Specification forming part of Letters Patent No. 8,541, dated November 25, 1851.

*To all whom it may concern:*

Be it known that I, ELIJAH GOLDTHAIT, of Fort Wayne, in Allen county, and State of Indiana, have invented certain new and useful Improvements in Plows for plowing and ditching wet prairie, marsh, bog or other land; and I do hereby declare that the same is described and represented in the following specification and accompanying drawings.

It is well known that there are large tracts of wet prairie, marsh, and bog lands covered with a sward sufficiently strong and stiff for a team to travel upon; but if it is removed the under strata is so soft that a team would find it very difficult to travel upon it, if they could at all, with a load. Consequently these tracts could not be plowed with a common plow in the usual manner with part of the team traveling in the furrow. Hence it became necessary, in order to plow them at all, to make an arrangement by which all the team could travel upon the sward and draw the plow, which has resulted in the following invention, which consists in adding a tongue, axle, and wheels, to which the plow is attached and in connection with which it is used, and in adding a cutter to separate the sward at a proper distance from the colter to form the opposite edge of the furrow; also, in attaching a piece to the heel of the mold-board, so as to take wide furrows and turn them flat; and in attaching a bar to the beam, extending forward beyond it, and connecting it to a lever, so that the plowman can regulate the depth and elevate the point to pass logs or other obstructions; also, in connecting a rope to the axle and to a lever at the hind end of the plow, so that the plowman can steer the wheels and guide the plow to counteract any little divergence of the team, so that the furrow will be uniform; and in connecting the tongue to the axle so as to vary it to enable the team to travel upon the sward in plowing wet land and to take a wide furrow in dry land with a common yoke and allow the off ox to travel in the furrow, thereby saving the expense of the long yoke in common use; and in making the clevis so as to lengthen or shorten, raise or lower, to suit the circumstances; also, in affixing a sliding clearer to remove any substances that collect before the colter.

To enable others skilled in the art to make and use my improved plow, I will proceed to describe its construction and the mode of using it, referring to the accompanying drawings.

Figure 1 is a perspective view of the plow and its appurtenances, ready for use. Fig. 2 is a section of the axle, tongue, and their connections with the plow. Fig. 3 is a clevis with a section of a beam.

The same letters of reference refer to similar parts in each drawing.

The beam A, colter A$'$, mold-board A$^2$, share A$^3$, landside B, and the handles B$'$ B$^2$ may all be constructed and connected together in the usual manner. I then make an axle, B$^3$, and wheels B$^4$ B$^4$ to revolve upon the same, and make three mortises in the axle B$^3$ to insert the three uprights $a$ $a'$ $a'$, which extend above the wheels and support the bar C, which forms the fulcrum of the lever C$'$, which extends back as far as the handles and is held down by one of the pins in the upright C$^2$, which is fastened to the landside at its lower end and connects it to the beam, and extends up above the handle, which is fastened to it, and supplied with pins to hold the lever C$'$ in the desired position.

The bar C$^3$ is fastened upon the top of the beam, and extends forward over the axle, and is connected to the lever C$'$ by the rope $b^5$. The cutter C$^4$ is fastened to the hounds $a^2$ $a^2$, which connect it to the uprights $a'$. This cutter is pressed down by the prop $a^3$, acted upon by the lever C$^5$, the fulcrum of which is a staple in the bar C. A laborer bears down this lever so that the cutter C$^6$ separates the sward for the first furrow at a proper distance from the colter, so that it will remain after the mold-board has turned it over, and not turn back again.

The rope D is fastened to the axle just inside of the left wheel, and to the lever D$'$, which has its fulcrum in the piece D$^2$, fastened to the landside, and the upper end is caught behind the pins in the piece $b$, fastened to the handle B$'$, to enable the plowman to steer the wheels and guide the plow. The piece D$^3$ is fastened to the mold-board with screws, so as to be readily put on and off, and extends back beyond the mold-board and enables the plow to turn a wider furrow than it would do without it.

E is a clearer, with a handle, $b^4$, that slides in cleats fastened to the upright C$^2$ and to the beam A. The clevis is made of two bars, $b'$ $b'$, connected by bolts, one of which lies across the beam, and the rope E' is fastened to the other and to the link $b^2$ in the axle to draw the plow. This clevis may be set more or less inclined, so as to make the plow run the desired depth. It may also be moved backward and forward upon the beam, and set so as to extend beyond the beam, so as to answer instead of a longer beam, and will apply as well to beams without a bar on the top as to those which have, (see Fig. 3,) provided it has pins $c$ $c$ in the top of the beam. A tenon of the tongue $E^2$, to which the team is hitched, as may be most convenient, passes through a mortise in the axle, and has an iron strap around the end for the key $h$, which prevents it from being pulled out, the mortise being wide enough for it to vibrate and the tenon long enough for it to have some play endwise through the axle, so that the draft will not be by the key $h$, but by the link $d'$, fastened into the beam by the key $d^2$, and is connected by a long link to the link $e$, which is fastened into the mortise $e'$ in the axle by the key $c^2$. The mortise $e'$ is made long enough to receive the link $b^2$, (fastened by the key $f^2$,) to which the rope E' is fastened. The wedge $f$ between the links may be put either side of both of them to vary the angle of the axle to take a wide or narrow furrow.

There is another mortise, $e^3$, through the axle, upon the opposite side of the tongue, into which the links $e$ and $b^2$ and the wedge $f$ are placed, to plow a wide furrow with a common yoke and allow the off ox in the team to travel in the furrow, thereby dispensing with the long yoke heretofore used for that purpose. When this change is made the links $e$ and $b^2$ must be so placed in the axle that the link $e$ will be between the link $b^2$ and the rope D, where it is connected to the axle. The brace F is connected to the tongue and to the bar C, to hold the studs $a$ $a'$ $a'$ nearly at right angles to the tongue.

The plow and its appurtenances having been constructed and completed as above described, the team is hitched to the tongue and guided by the driver. The plowman takes the handles to steady and adjust the plow. An assistant depresses the lever $C^5$ to separate the sward at a proper distance from the colter to form the opposite edge of the furrow. As the team proceeds the cutter $C^4$ and colter A' cuts a strip of sward of a proper width for a furrow, while the share $A^3$ separates it from the substrata, and the mold-board turns the furrow, completing the operation. If some substances collect before the colter, the plowman can remove them by pushing the clearer E forward by the handle $b^4$. If the plow runs too deep, he depresses the lever $c'$; if too shoal, he raises it and places it between the pins at the appropriate point. As the plow approaches any obstruction he depresses the lever C' to raise the point of the colter so as to clear it or to raise the plow out of the ground.

The plow may be made to run deep or shoal by shortening or lengthening the rope E', or by changing the position of the clevis on the beam, or both. After plowing the first furrow the cutter $C^4$, prop, and lever may be removed; and as the team travels upon the sward it is more likely to diverge than if one of the animals traveled in the furrows; but the plowman is able to counteract any slight divergence of the team and to take a furrow of a uniform width by varying the position of the lever D', connected to the axle by the rope D, which enables him to steer the wheels and guide the plow, as pulling the lever D' back turns the wheels to the left and increases the width of the furrow, and moving it forward lets the wheels run to the right and reduces it.

What I claim as my invention, and desire to secure by Letters Patent, is—

1. The cutter $C^4$, or its equivalent, to separate the sward for the first furrow at a proper distance from the colter, acted upon by the prop $a^3$ and lever $C^5$, or their equivalents.

2. The piece $D^3$, fastened to the heel of the mold-board, in combination with the cutter $C^4$, to turn wide furrows.

3. The mode of connecting the tongue and plow respectively to the axle by means of the links and the loose tenon on the tongue, substantially as described, so as to allow the team to walk entirely aside from the furrow or direct course of the plow in plowing prairie, marsh, or other land with soft under strata, and make the plow run smoothly and work well, and so as also to enable the plowman to take an extraordinarily wide furrow, with one member of the team walking in the furrow, with a common yoke, thus dispensing with the long yoke now commonly used for that purpose.

4. The rope D and lever D', or their equivalents, in combination with the mode of connecting the tongue and plow to the axle, substantially as described, for the purposes set forth in the within specification.

ELIJAH GOLDTHAIT.

Witnesses:
 ROBERT SPEAR,
 ELI BROOM.